Nov. 30, 1943.  W. A. EATON ET AL  2,335,825

FLUID COUPLING

Filed Oct. 3, 1941

Inventors
Wilfred A. Eaton.
Roger H. Casler
By N. D. Parker Jr.
Attorney

Patented Nov. 30, 1943

2,335,825

UNITED STATES PATENT OFFICE 2,335,825

FLUID COUPLING

Wilfred A. Eaton and Roger H. Casler, Elyria, Ohio, assignors to Bendix-Westinghouse Automotive Air Brake Company, Elyria, Ohio, a corporation of Delaware Application October 3, 1941, Serial No. 413,512

8 Claims. (Cl. 188—3)

This invention relates to braking systems for tractor-trailer vehicle trains and more particularly to means for coupling the braking system of a tractor vehicle to that of a trailer vehicle.

It has previously been customary in connection with fluid pressure brake systems installed on tractor-trailer trains to conduct the supply of fluid pressure from one vehicle to the other by means of flexible hose which is connected to at least one of the vehicles by means of a readily detachable coupling, so that, on uncoupling of the vehicles, the operator could at the same time uncouple the hose. In view of the fact that such hose couplings of the detachable type necessarily have an outlet port, it has frequently happened that, after the vehicles were uncoupled, dirt or other foreign substance entered the outlet port of the hose coupling and was, on subsequent recoupling of the vehicles, carried through the lines of the trailer by the flow of fluid pressure from the tractor brake system with resultant damage to the control valve mechanisms on the trailer.

It is accordingly an object of the present invention to provide novel means for coupling the fluid pressure control lines of tractor and trailer vehicles so constituted as to prevent the entrance of dirt or other foreign substance into the couplings during the time they are disconnected.

Another object of the invention is to provide closure means for such couplings so arranged as to be automatically operated to establish a fluid pressure connection between the coupling members when the members are coupled together.

Yet another object of the invention is to provide a detachable coupling device for fluid pressure lines having means for preventing the entrance of dirt to the coupling members when uncoupled and for permitting the passage of fluid when coupled, this means being actuated both by the act of mechanically locking the coupling members together and by the fluid pressure existing in the lines attached thereto.

A further object of the invention is to provide novel and efficient hose coupling means so constituted as to prevent the entrance of dirt to the interior of the coupling when the coupling is disconnected without acting to prevent the escape of fluid pressure from the coupling in the event of accidental disconnection of the coupling.

A still further object of the invention is to provide dirt excluder means for detachable hose couplings in a fluid pressure brake system so constituted as to permit proper operation of the braking system with the couplings in either connected or disconnected position.

Another object is to provide, in a coupling having a fluid pressure operated dirt excluder, means for connecting the pressure responsive member therein with atmosphere and means for automatically preventing the clogging of said atmospheric connection.

Yet another object is to provide a coupling of the above type so constituted as to prevent distortion of the parts with the coupling in disconnected position.

Other novel features of the invention will be more fully understood from the following detailed description when taken in connection with the accompanying drawing. It is to be expressly understood, however, that such drawing is for purposes of illustration only and is not to be taken as a definition of the limits of the invention, reference being had for such purpose to the appended claims.

Referring to the drawing, wherein similar reference numerals refer to like parts throughout the several views:

Fig. 1 is a diagrammatic view showing the elements of a tractor-trailer fluid pressure braking system equipped with hose couplings of the type above referred to;

Figure 1:
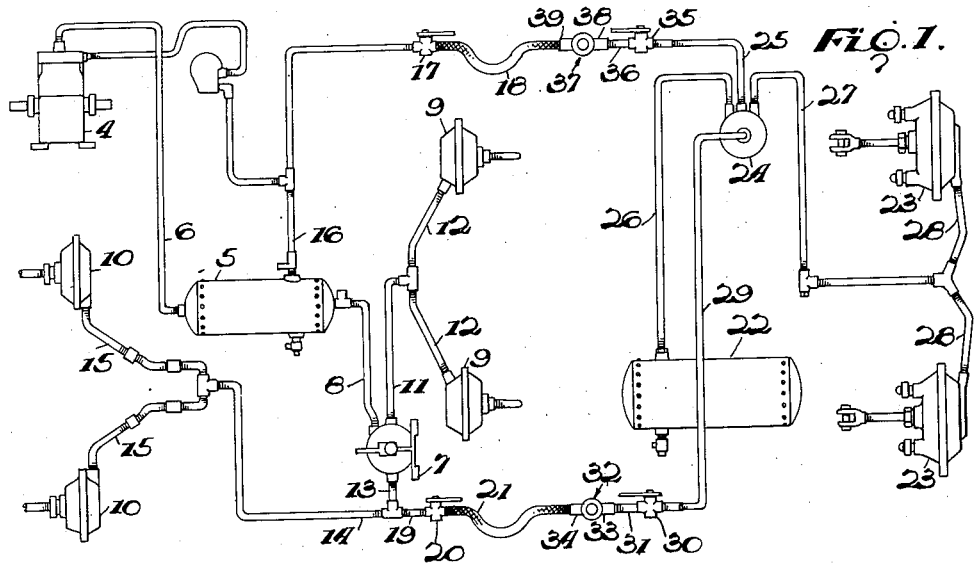

Referring more particularly to Fig. 1 of the drawing, a tractor-trailer fluid pressure brake system is disclosed therein, wherein a fluid compressor 4, driven by the vehicle motor or by any other suitable means, not shown, is adapted to supply fluid pressure to a tractor carried reservoir 5 through the medium of conduit 6 interconnected therebetween, the fluid pressure stored in the reservoir being thence conducted to the inlet chamber of a brake valve 7 through the medium of a connecting conduit 8. The brake valve 7 is not illustrated in detail but is preferably of the so-called self-lapping type and may be constructed in accordance with the principles set forth in the patent to W. A. Eaton No. 2,204,530, issued June 11, 1940. The tractor vehicle is provided with rear fluid pressure brake actuators or cylinders 9 and front brake actuators or cylinders 10, operation of the brake valve 7 by the vehicle operator serving to connect the conduit 8 with the rear brake chambers 9 through conduits 11 and 12 and with the front brake chambers 10 through conduits 13, 14 and 15 and, on reverse operation, to connect the brake chambers 9 and 10 with atmosphere to exhaust fluid pressure therefrom and release the brakes in a manner well known to those skilled in the art. In order that the trailer vehicle may also be supplied with fluid pressure from the reservoir 5 carried by the tractor, a conduit 16 connected to the reservoir serves to conduct air to a shut-off valve 17 located at the rear end of the tractor, this line constituting what is commonly known as the emergency line to the trailer. A flexible hose 18 is connected to the rear of the shut-off valve 17 and is adapted to be coupled to an emergency line of the trailer in a manner hereinafter to be described. In like manner, means are provided for conducting fluid pressure from the brake valve 7 to the braking system of the trailer by means of a conduit 19 connected to the brake valve through conduit 13 and provided with a shut-off valve 20 located adjacent the rear end of the tractor. A flexible hose 21 serves to connect the valve 20 with the trailer braking system as will hereafter be described.

The trailer braking system includes an emergency reservoir 22, a pair of fluid pressure brake actuators or cylinders 23 and a relay emergency valve 24 for controlling the degree of fluid pressure in the brake actuators 23. This latter valve, not shown in detail, is preferably constructed in accordance with the principles set forth in the patent to Stephen Vorech and Wilfred A. Eaton No. 2,049,984, issued August 4, 1936, particular reference being had to Fig. 3 of the drawing thereof. The emergency portion of the valve serves to permit the flow of fluid pressure from a trailer emergency line 25 to the trailer reservoir 22 through a conduit 26, while the relay portion of the valve serves, under certain conditions hereinafter to be described, to connect conduit 26 with a conduit 27, which latter conduit is connected with the trailer brake actuators 23 by means of conduits 28. The relay portion of the relay emergency valve is adapted to be controlled by fluid pressure conducted thereto through a conduit 29, this conduit being connected to the flexible hose 21 leading from the tractor through the medium of a shut-off valve 30, a conduit 31 and a coupling device 32 having a section 33 carried by the trailer and a similar section 34 detachable therefrom and connected with the flexible hose 21. In like manner, the trailer emergency line 25 is connected with the tractor carried hose 18 by means of a shut-off valve 35, a conduit 36 and a coupling device 37 having a portion 38 connected with the conduit 36 and a similar portion 39 detachable therefrom and connected with the flexible hose 18.

When it is desired to operate the vehicle, the compressor 4, on starting of the vehicle engine, serves to supply fluid pressure to the reservoir 5 through conduit 6, and the trailer reservoir 22 is in turn supplied with fluid pressure therefrom through conduit 16, valve 17, flexible hose 18, coupling device 37, conduit 36, valve 35, conduit 25, valve mechanism 24 and conduit 26, while fluid pressure is supplied to the tractor carried brake valve 7 from the reservoir 5 by means of the conduit 8 as heretofore stated. If it is now desired to apply the brakes on the vehicles, actuation of the valve 7 by the operator serves to supply fluid pressure from the reservoir 5 to the tractor brake actuators 9 and 10 through the conduits heretofore described and likewise serves to supply fluid pressure for the control of the relay emergency valve 24 through the medium of conduits 13 and 19, valve 20, flexible hose 21, coupling device 32, conduit 31, valve 30 and conduit 29, it being understood that, on operation of the valve 7 to supply a given degree of pressure to the actuators 9 and 10 on the tractor, the valve mechanism 24 on the trailer will likewise be actuated to connect the trailer emergency reservoir 22 with the trailer brake actuators 23 through conduit 26, valve 24 and conduits 27 and 28, the pressure supplied to the trailer brake actuators 23 from the reservoir 22 being substantially equal to that supplied to the tractor brake actuators 9 and 10 from the tractor reservoir 5.

In addition to the normal braking control operation just described, the braking system illustrated is so constructed as to provide an automatic application of the brakes on the trailer on failure of the fluid pressure in the emergency line for any reason, and the coupling devices 32 and 37 are so designed that, in the event of breakaway of the trailer from the tractor, the two adjacent parts of the coupling will separate without injuring or breaking the flexible connecting hose. In the event this separation of the adjacent parts of the coupling device 37 occurs, a reduction of pressure in the conduit 25 occurs which is sufficient to actuate the emergency valve and permit the brake actuators 23 to be energized by fluid pressure from the reservoir 22 as previously described.

Figure 2:
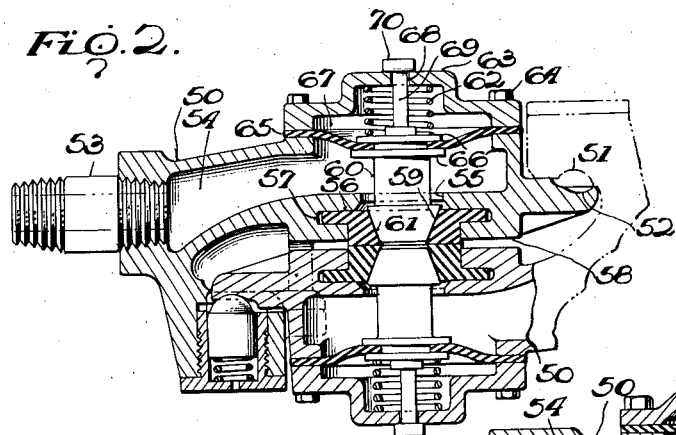
Fig. 2 is a sectional view of one form of the invention.

In view of the foregoing explanation of the operation of the braking system illustrated in Fig. 1, it will be apparent to those familiar with the braking art, that separation of the coupling members 38 and 39 on break-away of the trailer must necessarily result in a reduction of pressure in the conduit 25 if proper operation of the trailer braking system is to take place, and, with particular reference to Fig. 2 of the drawing, means have been provided for preventing the entrance of foreign matter into the coupling members when they are in a disconnected position, without in any way interfering with the above described emergency operation of the brakes on separation of the coupling members.

The coupling device illustrated in Fig. 2 includes a pair of body members 50 substantially identical in form and adapted, on relative rotative movement thereof, to lock together as more fully described in the patent to C. C. Farmer No. 1,765,576, issued June 24, 1930. Each of the members 50 is provided with a cam surface 51 and a cam surface 52 oppositely disposed and adapted, on rotative movement of the couplings, to move the coupling members toward each other. The casing 50 is adapted to be connected with the fluid pressure brake system through the medium of a conduit 53 connected with a chamber 54 formed in the casing, this chamber being provided with an outlet port 55 having a resilient tubular gasket 56 suitably retained therein as by means of its engagement with a groove 57 formed in the wall of the bore. The gasket projects below a machined face 58 formed on the casing and is adapted, in response to the operation of the cam faces 51 and 52, on rotative movement of the members, to engage the corresponding gasket in the other member in sealing engagement to prevent the escape of fluid pressure therebetween. The tubular gasket is preferably provided with a tapered bore 59 for establishing a connection between the chambers 54 of the coupling casings and this bore is normally closed by means of a valve member 60 having a tapered portion 61 normally urged into a position to close the tapered bore of the gasket by means of a spring 62 interposed between the upper end of the valve member and a cover member 63 clamped to the casing by means of bolts 64. A pressure responsive member or diaphragm 65 is clamped between the casing 50 and the cover member 63 and is attached at its center to the valve member 60 in sealing engagement therewith by means of suitable flanges 66 formed on the valve member, the diaphragm thus serving, in connection with the cover member 63, to define a second chamber 67 which is maintained under atmospheric pressure by virtue of its connection with atmosphere through a port 68 formed in the wall of the cover. In order that the downward movement of the valve member 60 under the influence of the spring 62 may be limited to prevent undue distortion of the gasket 56, the valve member 60 is also provided with a stem 69 extending through the bore 68 and provided at its outer end with a head 70, which head is adapted to contact the outer face of the cover 63 and limit the downward travel of the valve 60 to a predetermined amount. In the event the port 68 is clogged with dirt, the valve stem 69 acts by virtue of its movement therethrough to loosen the dirt and eliminate this condition.

If a coupling device of the construction just described is connected, for example, between the flexible hose 18 and the trailer emergency lines 36 and 25 of the brake system shown in Fig. 1, it will be apparent that the admission of fluid pressure to the chamber 54 from the tractor will act to move the diaphragm 65 upwardly with the result that the valve member 60 will likewise move upwardly to permit the passage of fluid pressure through the bore of the resilient gasket 56. If the spring 62 in the lower coupling member is properly chosen, the fluid pressure acting on the upper surface of the lower valve member 60 will be sufficient to move the valve downwardly against the force of the spring and permit the passage of fluid pressure into the chamber 54 of the lower coupling member, whereupon this pressure will act on the lower diaphragm member to move the lower valve 60 further downward and permit unobstructed communication between the chambers 54 of the two coupling members, and the valves will be maintained in open position until such time as the pressure again drops due either to extreme leakage in the system or to disconnection of the couplings. When such disconnection occurs, the chamber 54 of the lower coupling member connected to the emergency line of the trailer will remain connected to atmosphere until the pressure in the chamber drops to a point where the spring is sufficient to overcome the air pressure then acting on the diaphragm, whereupon the valve will close in such a manner as to prevent the entrance of dirt and other foreign substance into the chamber 54, while the action of the valve in remaining open until the pressure drop occurs will permit the emergency valve on the trailer to effect an emergency application of the brakes due to the drop in pressure in the conduit 25.

In the event the coupling device described in connection with Fig. 2 were to be used in the service line between the tractor and trailer, however, it is apparent that the valve 60 in the portion connected to the trailer might tend to restrict the flow of fluid pressure between the tractor and trailer due to the fact that this conduit is only under pressure when the brakes are being applied, and further due to the fact that this brake application must take place in the shortest possible space of time in order to obtain efficient operation of the brakes. The construction illustrated in Fig. 3 of the drawing, accordingly, contemplates a coupling more particularly adapted for use interchangeably in either the emergency line or the service line to prevent the possibility of this undesirable restriction of fluid pressure flow from occurring. Here again, a casing 50 is provided for each coupling member having a chamber 54 formed therein and being provided with an outlet port 55 carrying a resilient gasket 56 adapted to engage a corresponding resilient gasket in the other section of the coupling. A spring pressed diaphragm 65 is also clamped between the casing 50 and a cover plate 63 mounted on the casing and is attached to the valve for normally urging the valve toward closed position and for opening the valve under the action of fluid pressure in the manner heretofore described in connection with the mechanism shown in Fig. 2. In this particular embodiment of the invention, however, mechanical means are also provided for opening the valve, such means including a plunger 80 slidably mounted for vertical movement in a bore 81 formed in the casing, the lower end of the plunger being adapted, on interengagement of the coupling members, to be moved upwardly by virtue of its engagement with a cam surface 82 formed on the other coupling member, and the upper end engaging a projection 83 on a lever 84 pivotally mounted at its left end on the casing by means of a pivot pin 85 and adapted, at the right end, to engage the lower face of the flange 66 formed on the valve 60, which flange also acts to connect the valve with the diaphragm as previously described in connection with Fig. 2. In order that leakage of fluid pressure by the plunger 80 may be prevented, grooves 86 are provided on the plunger, resilient gaskets 87 being carried by these grooves in sealing engagement with the walls of the bore 81. The other member of the coupling device may, if desired, also have the construction just described, and, if this is the case, it will be apparent that engagement of the coupling members of the device will actuate the correspoending plungers to open the valves through the connections described and permit unrestricted communication between the chambers 54 of the coupling members. Thus, if the upper coupling member has its chamber 54 connected with the service line of the tractor through flexible hose 21, and the lower coupling member has its chamber 54 connected with the relay emergency valve mechanism 24 of the trailer through conduit 31, valve 30 and conduit 29, it will be apparent that both valves will be maintained in open position allowing unimpeded flow of fluid pressure through the coupling to permit efficient control of the service brakes on the trailer.

It may be desired, however, to employ this coupling assembly in the emergency line as well, and, although it might appear that the mechanical operation of the valve would be sufficient for all needs, it will be understood that, if the valves were mechanically operated only, separation of the coupling parts in the emergency line would result in immediate closing of the valves under the action of the spring 62, with the result that the drop in pressure in the emergency line 25 of the trailer would be insufficient to cause operation of the valve mechanism 24 to effect an emergency application of the trailer brakes.

With the pressure responsive diaphragm 65 incorporated in the coupling, however, and serving to maintain the valve 60 in open position until the pressure in the trailer emergency line drops below a predetermined value, it will be apparent that the valve in the coupling member attached to the trailer will remain open until a sufficient pressure reduction has occurred in the conduit 25 to effect an emergency application of the trailer brakes. It will also be understood in this connection that a coupling member of the type shown in Fig. 3 may be combined with a coupling member of the type shown in Fig. 2 or that the pressure responsive member may be omitted in one of the coupling members, as, for example, in the coupling member attached to the hose 18 in the emergency line of the tractor, without departing in any way from the spirit of the invention. It will also be apparent that the omission of the pressure responsive member in the coupling portion 39 of Fig. 1 will cause the valve 60 to close immediately on separation of the coupling members 39 and 38, thus preventing the escape of fluid pressure from the tractor reservoir 5 while the rear portion of the coupling device 38, having the pressure responsive member incorporated, will permit the escape of fluid pressure to effect a reduction in the pressure in line 25 with a resultant emergency application of the trailer brakes.

Figure 3:
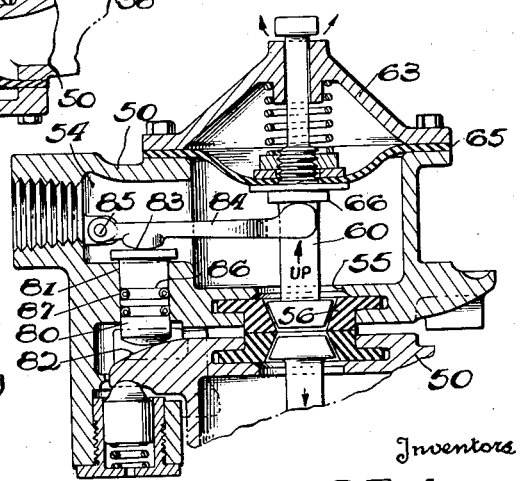
Fig. 3 is a sectional view of another form of the invention.
Figure 4:
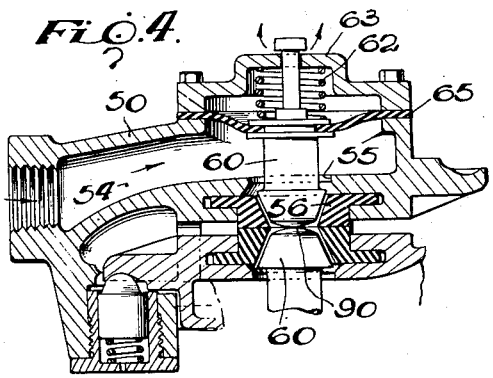
Fig. 4 is a sectional view of a modified form of the invention illustrated in Fig. 2.

Fig. 4 shows a somewhat simplified form of construction combining some of the advantages of the structures illustrated in Figs. 2 and 3, mechanical and fluid pressure actuation of the valves being accomplished with the elimination of a considerable number of actuating parts. With particular reference to Fig. 4 it will be noted that a casing 50 is provided for each half of the coupling, this casing being provided with a chamber 54 having an outlet port 55, together with a resilient sealing gasket 56. A valve 60 is also provided in each portion of the coupling for normally closing the tapered bore in the gasket, the valve being urged to closing position by means of a spring 62 interposed between the valve and a cover 63 carried by the casing. A pressure responsive diaphragm 65 is clamped between the casing and the cover and is operatively attached to the valve member 60. In order that mechanical actuation of the valve may take place on joining of the coupling members, the lower end of the upper valve is provided with a rounded projection 90 which extends below the face of the resilient sealing gasket 56 when the valve is in closed position. Since this rounded projection is carried by both the upper and lower valves, it will be readily understood that on joining of the coupling members, these projections will engage, with the result that the upper valve will be moved in an upward direction against the tension of the spring 62 while the lower valve will be moved in a downward direction, thus moving both valves out of engagement with the tapered bores of the resilient sealing gaskets and permitting the unrestricted passage of fluid pressure from one portion of the coupling to the other. In the event the parts of the coupling device are separated, it will be apparent that as heretofore described in connection with other embodiments of the invention, the valves will be maintained in open position by the action of fluid pressure on the diaphragms 65 until the pressure has dropped to a point where the tension of the springs 62 is sufficient to cause the valves to close. When the valves are in closed position, the openings into the chamber 54 through the gaskets 56 are closed and the entrance of dirt and other foreign matter into the interior of the couplings which might be carried to the control valves of the braking system is effectively prevented.

It will be seen from the foregoing description and from a study of the drawing that coupling devices constructed as shown will effectively prevent the entrance of dirt and other foreign substances into the vital parts of the braking system, and furthermore, that these coupling devices in the various forms shown may be combined in any desired manner in the various lines between the tractor and trailer so as to provide for the most efficient operation of the brake system under all operating conditions.

While several modifications of the invention have been described and illustrated, it is to be expressly understood that the invention is in no way limited thereby and that various changes and modifications may be made therein without departing from the scope of the invention, for the limits of which reference must be had to the appended claims.

What is claimed is:

1. Coupling means for vehicle carried fluid pressure braking systems of the type including an emergency line on each vehicle comprising ported coupling means associated with each line, means for normally closing said ports, means operable on connection of said coupling means for actuating said closure means to open said ports, and means carried by said closure means and responsive to the pressure in said lines for actuating said closure means to maintain said ports in open position regardless of the action of said first named actuating means.

2. The combination with a vehicle carried fluid pressure braking system of the type including a fluid pressure brake control line carried by each vehicle, of means for coupling said control lines including a coupling member associated with each line, a port in each member adapted on coupling thereof to register with the port in the other member, means for normally closing the port in each of said coupling members, means operable on engagement of said coupling members for moving said closure means to open said ports, and means carried by said closure means and operable in response to a predetermined pressure in said lines for actuating the corresponding closure means to maintain said ports in open position.

3. The combination with a fluid pressure brake system for a tractor and trailer of the type each having a service line and an emergency line adapted to be connected for controlling the trailer brakes from the tractor, of means for detachably coupling the service lines of the two vehicles including a tractor carried coupling member having a normally closed outlet port and means operable in response to coupling of said member to a corresponding member for opening said port, coupling means carried by the trailer carried service line having means responsive to coupling thereof with the tractor carried coupling for establishing a connection therebetween, and ported coupling means carried respectively by the tractor and trailer emergency lines, the tractor carried coupling means having valvular means actuated in response to the coupling operation for opening the port thereof and the trailer carried coupling means having valvular means operable in response to variations of fluid pressure in the trailer carried emergency line for maintaining the ports thereof in open position when the pressure in said trailer carried emergency line exceeds a predetermined value, whereby on separation of the vehicles and disconnection of the service and emergncy couplings, the escape of fluid pressure from the tractor carried service and emergency lines is automatically prevented and the escape of fluid pressure from the trailer carried emergency line is permitted.

4. A detachable coupling device for connecting a pair of fluid pressure lines including a coupling member associated with each line, an outlet port in each of said coupling members, means associated with each of said members for normally closing said ports, means actuated in response to engagement of said couplings for moving said closure members to port opening position, and a single means carried by said closure means and responsive to the pressure in said conduits for actuating said closure members and maintaining the latter in port opening position when the pressure in said conduits exceeds a predetermined value regardless of the operation of said first named closure actuating means.

5. Means for coupling a pair of fluid pressure conduits including a coupling member associated with each conduit and adapted to be connected with the corresponding coupling member attached to the other conduit, and each of said members including exterior ports, including a closure member normally closing said ports and associated with each coupling member, mechanically operable means operable on coupling of the members for moving one of said closure members to port opening position, and fluid pressure responsive means associated with the other coupling member and adapted to move the closure member thereof to port opening position whenever the pressure in the second named conduit exceeds a predetermined value.

6. A coupling member for a fluid pressure conduit adapted to be connected with a corresponding coupling member on another fluid pressure conduit having an outlet port, valvular means for normally closing said port, a pressure responsive member associated with said valvular means for moving said valvular means to port opening position when the pressure in said conduit exceeds a predetermined value, and means actuated on coupling of said member to the corresponding coupling member for positively moving said valvular means to port opening position irrespective of the action of said pressure responsive means.

7. A detachable coupling member for fluid pressure conduits comprising a casing having an outlet chamber and an outlet port associated therewith, valvular means for controlling the opening and closing of said outlet port, resilient means interposed between the casing and said valvular means for normally maintaining said valvular means in port closing position, a pressure responsive member positioned in such casing and dividing said casing into outlet and atmospheric chambers, means for connecting said pressure responsive member with said valvular means for actuating the valvular means to port opening position in response to an increase in pressure in said outlet chamber, a port in the wall of the casing for connecting the atmospheric chamber with atmosphere, and means associated with said port and connected to and movable with said valvular means for preventing clogging of said port by foreign substances.

8. A coupling device for a pair of fluid pressure lines comprising a pair of detachable coupling members connected thereto, each of said coupling members having a chamber formed therein, a pressure responsive member carried by the casing and dividing said chamber into outlet and atmospheric chambers, an outlet port in said outlet chamber adapted to register with the corresponding port in the other coupling member on engagement thereof, a flexible sealing gasket associated with said outlet port and having a bore therethrough, valvular means carried by the housing and normally positioned with relation to said gasket to close the bore therethrough, resilient means interposed between said valvular means and casing for maintaining the valvular means in said position, means for actuating said valvular means and operable on joining of said coupling members for moving said valvular means away from said sealing gasket to permit the passage of fluid therethrough, and means connecting said pressure responsive means with said valvular means whereby the pressure in said outlet chamber actuates said pressure responsive means to maintain said valvular means in said last named position.

WILFRED A. EATON.
ROGER H. CASLER.